United States Patent [19]
Tekatch et al.

[11] Patent Number: 4,832,930
[45] Date of Patent: May 23, 1989

[54] DECOMPOSITION OF AMMONIUM THIOCYANATE

[76] Inventors: William M. Tekatch, 19 Pheasant Place, Hamilton, Ontario, Canada, L9A 4Y4; Karol J. Balaz, 339 East 14th Street, Hamilton, Ontario, Canada, L9A 4C1

[21] Appl. No.: 188,851

[22] Filed: May 2, 1988

[51] Int. Cl.$^4$ .............. C01B 17/02; C01B 17/50; C01C 1/00; B01D 53/16

[52] U.S. Cl. .................. 423/356; 423/236; 423/540; 423/541 A; 423/567 A; 423/DIG. 12; 423/437

[58] Field of Search .......... 423/236, 356, 540, 541 A, 423/567 A, DIG. 12, 437; 210/749, 758, 757

[56] References Cited

U.S. PATENT DOCUMENTS

| | | | |
|---|---|---|---|
| 2,524,054 | 10/1950 | Hill | 564/241 |
| 3,645,683 | 2/1972 | Isbell, Jr. | 423/540 |
| 3,810,968 | 5/1974 | Renault et al. | 423/541 A |
| 3,953,577 | 4/1976 | Ooka et al. | 423/236 |
| 4,505,881 | 3/1985 | Diaz | 423/567 A |

FOREIGN PATENT DOCUMENTS

| | | | |
|---|---|---|---|
| 2364244 | 7/1974 | Fed. Rep. of Germany | 423/236 |
| 48-75470 | 10/1973 | Japan | 423/236 |
| 50-91600 | 7/1975 | Japan | 423/236 |
| 461065 | 4/1975 | U.S.S.R. | 210/758 |
| 311725 | 2/1930 | United Kingdom | 423/356 |

*Primary Examiner*—John Doll
*Assistant Examiner*—Jeffrey E. Russell

[57] ABSTRACT

A process for decomposing ammonium thiocyanate and equivalent compounds comprising mixing the compounds with molten ammonium sulfate at atmospheric pressure and about 310° C. The compounds decompose giving off carbon dioxide, sulfur dioxide, ammonia and sulfur and leave a residue of ammonia salts but no organic materials.

7 Claims, 1 Drawing Sheet

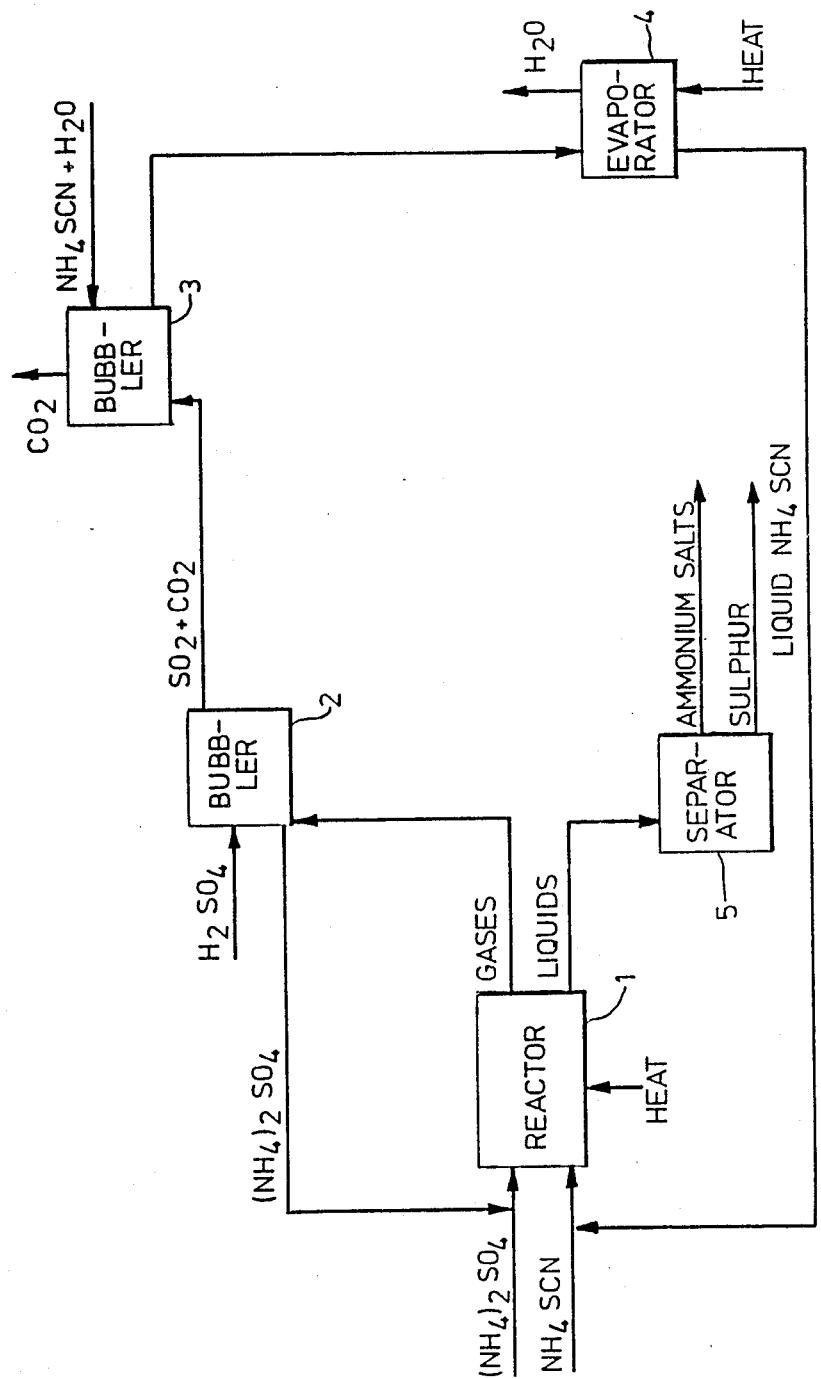

DECOMPOSITION OF AMMONIUM THIOCYANATE

FIELD OF THE INVENTION

This invention relates to the processing of coke oven gases and, in particular, to the decomposition of ammonium thiocyanate, thiourea, their equivalents and mixtures thereof produced during the removal of hydrogen cyanide from coke oven gas by aqueous ammonium polysulfide.

DESCRIPTION OF THE PRIOR ART

It is clearly undesirable to release ammonium thiocyanate into the environment due to its toxic properties and it has been proposed in the past to decompose the ammonium thiocyanate with various processes. These processes generally were carried out at high pressure in an acidic aqueous medium. An altenative process employed a reductive combustion process which is difficult to control and expensive.

None of the preceding processes yielded any useful products or, if so, only a limited amount of useful product. The water processes required high pressure and expensive equipment.

Typical of such prior processes is that of U.S. Pat. No. 1,984,757 issued Dec. 18, 1934 which uses sulfuric acid in an aqueous solution at temperatures of 150°–180° C. with the resultant pressure. The apparatus must be constructed to withstand such pressure and also withstand the corrosive action of the mixture.

An alternative process is disclosed in U.S. Pat. No. 2,524,054 issued October 1950 which includes heating the ammonium thiocyanate in the presence of alkali metal sulfamates or ammonium sulfate to a temperature of 80°–245° C. to produce salts of guanidine. The reaction does decompose the ammonium thiocyanate, but the remaining products are still dangerous and undesirable.

SUMMARY OF THE INVENTION

It is the purpose of this invention to provide a process for decomposing ammonium thiocyanate or similar compounds at atmospheric pressure with a reliable process that yields useful output products. In the process, the ammonium thiocyanate either as a solid or as a solution is heated with ammonium sulfate to a temperature at which the ammonium sulfate liquifies. The reaction proceeds to decompose the ammonium thiocyanate producing sulfur, ammonia, carbon dioxide, sulfur dioxide leaving a residue including ammonium salts.

BRIEF DESCRIPTION OF THE DRAWINGS

The single FIGURE of the drawings presents a schematic block diagram of a process utilizing this reaction and producing the desired output products.

DESCRIPTION OF THE PREFERRED PROCESS

Considering the single FIGURE, it is seen that the input materials, ammonium thiocyanate and ammonium sulfate, are introduced into the reactor 1 where they are heated. The gases, ammonia, sulfur dioxide and carbon dioxide bubble off freely. With temperatures above the melting point of ammonium sulfate, the solid materials form a liquid as long as the temperature does not exceed the boiling point of sulfur (444.6° C.). The gases evolved may be re-introduced by passing the gases through bubbler 2 which contains sulfuric acid which reacts with the ammonia to produce ammonium sulfate which can be separated and re-introduced to reactor 1.

The remaining sulfur dioxide and carbon dioxide can be bubbled through the incoming aqueous solution of ammonium thiocyanate and polysulfide in bubbler 3. The remaining carbon dioxide can be released to the atmosphere while the ammonium thiocyanate is boiled in evaporator 4 to remove the water and then introduced into reactor 1 as molten $NH_4SCN$. The liquid sulfur and ammonium salts may be tapped out of reactor 1 and separated in separator 5. The reaction in the reactor will be as shown in the following equation:

$$NH_4SCN + (N_4)_2SO_4 \rightarrow S + 4NH_3 + CO_2 + SO_2$$

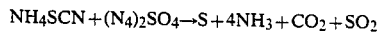

The ammonium salt remaining in reactor 1 will be primarily ammonium imido disulfate.

In the following examples the reaction was carried out in a batch process in a reactor. Yields reported were less than actual, because they were based on the weight change of the reaction vessel plus contents, caused by the reaction. The vessel retained sublimed material which reduced the change in weight and thus the apparent yield.

EXAMPLE #1

76 parts by weight of ammonium thiocyanate were reacted with 132 parts of ammonium sulfate (a molar ratio of 1:1). The materials were heated to 325° C. over a 1.5 hr. period. Analysis of the residue showed ammonium salts, sulfur, no thiocyanate and no organic material. The apparent yield was 56% of the calculated product.

EXAMPLE #2

84 parts of ammonium sulfamate ($NH_4SO_3NH_2$) and 58 parts of ammonium thiocyanate by weight were heated to 370° C. over a 1.5 hr. period. The residue was free of thiocyanate and organic matter and the apparent yield was 86%.

EXAMPLE #3

To a melt of 25 parts by weight of ammonium sulfamate at 370° C. was gradually added, 6 parts of ammonium thiocyanate (a molar ratio of $2\frac{2}{3}$:1). Additions were made at a rate to maintain the melt above 280° C. The reaction was complete in less than 10 minutes as indicated by the absence of further gas production. The apparent yield was 70%.

In each of the examples the residue in the reaction vessel was found to consist of ammonium sulfamate, ammonium imido disulfate and sulfur. It will be noted that no hazardous products remained, the organic material having been completely dissociated.

While the examples given were batch processes, it will be appreciated that in a commercial situation the continuous process is to be preferred if possible. Example #3 is closest to such a continuous process.

It will be understood that ammonium thiocyanate when in liquid form will normally result in an equilibrium mixture of ammonium thiocyanate and thiourea which may be termed an equivalent of ammonium thiocyanate.

We claim:
1. A process for decomposing a compound selected from the group consisting of ammonium thiocyanate, thiourea or mixtures thereof comprising maintaining a quantity of ammonium sulfamate in a molten state, adding a less than molar equivalent of the compound to said ammonium sulfamate and maintaining the resulting mixture at atmospheric pressure and a temperature greater than 250° C. but less than 444.6° C. until completion of the reaction.

2. A process as claimed in claim 1 wherein the mixture is maintained at the specified temperature until no further evolution of gases is evident.

3. The process as claimed in claim 1 wherein the compound is ammonium thiocyanate.

4. The process as claimed in claim 2 wherein the compound is ammonium thiocyanate.

5. The process as claimed in claim 3 wherein the temperature is maintained at about 310° C. until no further evolution of gas is evident.

6. The process as claimed in claim 1 wherein the compound is a mixture of ammonium thiocyanate and thiourea.

7. The process as claimed in claim 6 wherein the temperature is maintained at about 310° C. until no further evolution of gases is evident.

* * * * *

UNITED STATES PATENT AND TRADEMARK OFFICE
CERTIFICATE OF CORRECTION

PATENT NO. : 4,832,930

DATED : May 23, 1989

INVENTOR(S) : Tekatch et al.

It is certified that error appears in the above-identified patent and that said Letters Patent is hereby corrected as shown below:

Column 2, line 14, "$N_4$" should read --

Column 2, line 14, "$(N_4)$" should read --$(NH_4)$--.

Signed and Sealed this

Sixth Day of March, 1990

Attest:

JEFFREY M. SAMUELS

*Attesting Officer*  *Acting Commissioner of Patents and Trademarks*